UNITED STATES PATENT OFFICE.

WILLIAM T. HEADLEY, OF PHILADELPHIA, PENNSYLVANIA, ASSIGNOR TO HEADLEY GOOD ROADS COMPANY, OF WILMINGTON, DELAWARE A CORPORATION OF DELAWARE.

METHOD OF MAKING PAVEMENTS, ROADS OR STREETS, AND CELLAR-FLOORS OR THE LIKE.

1,035,787. Specification of Letters Patent. Patented Aug. 13, 1912.

No Drawing. Application filed September 27, 1911. Serial No. 651,543.

*To all whom it may concern:*

Be it known that I, WILLIAM T. HEADLEY, a citizen of the United States, residing at the city of Philadelphia and State of Pennsylvania, have invented certain new and useful Improvements in the Method of Making Pavements, Roads or Streets, and Cellar-Floors or the Like, of which the following is a specification.

My invention relates to improvements in roads or streets, pavements, cellar floors, or the like, and in the method of providing the same in a tough, stable, resilient waterproof finished condition; and in such connection my invention relates to the provision of a foundation upon which is applied by continuing acts, cement concrete having a water-proof substance, in solution in a cold state incorporated therewith, the substance of which solution being of a character adapted to hold the cement of the concrete in a jelly-like state and also of filling the interstices of the aggregated mass as well as increasing its toughness without sacrifice of structural strength of the finished waterproof product.

Hitherto, pavements, roads, floors, or the like, have been produced by various methods, among them, by using emulsified asphalt with aggregated mineral materials as well as bitumen in a hot condition to fill the voids, but such structures have not been produced by immediate following acts or operations, upon a foundation by placing porous cement concrete as a course, having a water-proofing substance, in solution in a cold state incorporated therewith, so as to become more or less aggregated with the foundation to render the whole formation after tamping or rolling, tough and stable as well as increasing the structural strength of the finished product.

My present invention, consists of applying to a suitable foundation, a compounded or mixed cement-concrete, unbalanced, that is, with the percentage of stone or other mineral aggregate largely in excess of the cement, sand or other fine mineral elements to derive a cement-concrete which is porous or honey-combed and in addition to the above elements adding emulsified liquid bitumen in a cold state thereto so as to permeate the honey-combed or porous cement-concrete, to toughen and render stable the structure formed therefrom, as well as to maintain resiliency in the formed stable structure produced. Voids being filled through the added bitumen of the emulsified product, and consolidated by the tamping or rolling of the said aggregated mass.

The nature and scope of my present invention will be more fully understood from the following description giving certain preferred methods for carrying out my invention, which I have practiced with most excellent results.

Upon preferably a cement concrete foundation which while still wet and soft, a course of aggregated mineral matter is placed, and preferably of the following character, viz:—Twelve (12) parts of crushed stone or other mineral aggregate susceptible of passing through a two (2″) inch mesh screen and being retained on a half (½″) inch mesh screen. The stone or other mineral materials are subjected to a sprinkling of a solution of an emulsified bitumen of preferably two (⅔) thirds by weight to one (⅓) third of water by weight. The quantity of the emulsified bitumen being equal to between 12% and 20%, by weight, of the mineral aggregate or stone employed. This conglomerate mass is then thoroughly mixed by hand or machinery until the elements of the mineral aggregate mass have become coated with said emulsified bitumen, when one (1) part of slow setting Portland cement and six (6) parts of sand, mixed together, are added to the mineral aggregated mass so that the sand and cement may adhere to the aggregated mineral mass. The whole conglomerate mass is then again sprinkled with the said emulsion and thoroughly mixed until presenting a condition most nearly corresponding to that of ordinary cement concrete. After which the conglomerate mass is tamped or rolled to provide a compact and tough waterproof monolithic structure. The important feature of this invention is the providing of the porous cement concrete with the various elements coated and with interstices of the same filled with bitumen of the emulsified product, the bitumen tending to retard the setting of the mass and holding the Portland cement in a jelly-like or substantially colloidal state, whereby this otherwise brittle aggregated mass not only sets up but is rendered water-proof, tough and resilient in its finished structural state, as used.

The aggregate thickness of road or like structure desired may be made complete by the placing of the same on a Portland cement concrete foundation in which instance the following method may be availed of to carry out such a result. A sub-grade of cement concrete is first provided and of the desired thickness, composed of one (1) part of Portland cement, four (4) parts of clean sand or other suitable fine materials and seven (7) parts of crushed stone or other suitable mineral aggregate or any other desired concrete mixture and when the concrete base has been settled, either by tamping or rolling and while still wet and in a plastic condition, the aforesaid water-proof course in a cold liquid state is added thereto, thus in the end to render the structure tough and stable as well as to give resiliency to the conglomerate massed structure in its stable condition, after final tamping or rolling of the same.

Having thus described the nature and objects of my invention, what I claim as new and desire to secure by Letters Patent is:—

1. The herein described method of producing a pavement or road, which consists in first laying a base of hydraulic cement concrete; second, superimposing thereon a wearing course of concrete prepared by coating an aggregate with an emulsion of bitumen and water, mixing sand and cement with the coated aggregate, sprinkling then the mixture with the emulsion and third, compressing.

2. The herein described method of producing a pavement or road, which consists in coating an aggregate with an emulsion of bitumen and water, mixing the coated aggregate with sand and cement, adding more emulsion to the mixture and superimposing the resultant mixture on a hydraulic cement concrete base, while both are wet and in a plastic condition and before the initial set has taken place in the cement concrete base.

In witness whereof, I have hereunto set my signature in the presence of the two subscribing witnesses hereto.

WILLIAM T. HEADLEY.

Witnesses:
THOMAS M. SMITH,
HELEN F. MILLER.